United States Patent [19]
Koyama et al.

[11] Patent Number: 5,987,878
[45] Date of Patent: Nov. 23, 1999

[54] FUEL REFORMING APPARATUS AND ELECTRIC POWER GENERATING SYSTEM HAVING THE SAME

[75] Inventors: Kazuhito Koyama; Shigehisa Sugita; Shinya Marushima; Yuji Makino; Kazuhiro Gonda, all of Hitachi, Japan

[73] Assignee: Hitachi, Ltd., Tokyo, Japan

[*] Notice: This patent is subject to a terminal disclaimer.

[21] Appl. No.: 09/115,521

[22] Filed: Jul. 15, 1998

Related U.S. Application Data

[63] Continuation of application No. 08/901,266, Jul. 28, 1997, Pat. No. 5,826,422, which is a continuation of application No. 08/580,376, Dec. 28, 1995, abandoned.

[30] Foreign Application Priority Data

Jan. 9, 1995 [JP] Japan .................................. 7-1019

[51] Int. Cl.⁶ ...................................................... F02B 43/00
[52] U.S. Cl. .......................... 60/39.12; 60/39.55; 60/723; 431/7; 431/328; 422/177
[58] Field of Search ............................... 60/39.12, 39.55, 60/723; 431/7, 170, 326, 328, 351, 352, 353; 422/177, 171

[56] References Cited

U.S. PATENT DOCUMENTS

| | | | |
|---|---|---|---|
| 4,341,069 | 7/1982 | Bell et al. | 60/39.12 |
| 4,472,936 | 9/1984 | Uchiyama et al. | 60/39.12 |
| 5,388,395 | 2/1995 | Scharpf et al. | 60/39.12 |
| 5,595,059 | 1/1997 | Huber et al. | 60/39.12 |
| 5,826,422 | 10/1998 | Koyama et al. | 60/39.12 |

*Primary Examiner*—Charles G. Freay
*Attorney, Agent, or Firm*—Antonelli, Terry, Stout & Kraus, LLP

[57] ABSTRACT

A cylindrical fuel reforming apparatus covered with a thermal insulating layer 16 comprises a fuel flow passage 1 contoured by a cylindrical contour wall 2 in its central axial direction and a reforming catalyst bed 3 in the middle of the flow passage for reforming gas to be reformed flowing from the upstream of the fuel flow passage 1 into a proper reformed gas. A cooling jacket 10 is arranged in the upstream of the reforming catalyst bed 3 so as to surround the fuel flow passage 1 and to be supplied with steam 11 for cooling the cylindrical contour wall 2. There are provided in the cylindrical contour wall 2 in the upstream of the reforming catalyst bed 3 a plurality of injection nozzles 15 communicating the cooling jacket 10 with the fuel flow passage 1 so that the steam 11 introduced into the cooling jacket 10 is allowed to flow into the fuel flow passage 1.

5 Claims, 7 Drawing Sheets

FUEL REFORMING APPARATUS AND ELECTRIC POWER GENERATING SYSTEM HAVING THE SAME

CROSS REFERENCE TO RELATED APPLICATIONS

This is a continuation application of U.S. Ser. No. 08/901, 266, filed Jul. 28, 1997, now U.S. Pat. No. 5,826,422 which is a continuation application of U.S. Ser. No. 08/580,376, filed Dec. 28, 1995, now abandoned.

BACKGROUND OF THE INVENTION

The present invention relates to a fuel reforming apparatus and an electric power generating system having the fuel reforming apparatus, and more particularly to a fuel reforming apparatus of the direct heat exchange type which is suitable for a gas turbine electric power generating system and a electric power generating system having the fuel reforming apparatus.

A fuel reforming apparatus of the indirect heat exchange type, a fuel reforming apparatus of the direct heat exchange type and the like are known types of fuel reforming apparatuses for reforming a raw fuel, such as hydrocarbon, into a hydrogen enriched gas.

For example, the fuel reforming apparatus of the indirect heat exchange type comprises a reactor pipe having a reforming catalyst therein and a burner for applying heat to the reactor pipe, in which a raw fuel which flows into the reactor pipe through one end of the reactor pipe is reformed into a hydrogen enriched gas using the reforming catalyst inside of the reactor pipe, while the reactor pipe is being heated with the burned gas from the burner.

On the other hand, the fuel reforming apparatus of the direct heat exchange type comprises a fuel flow passage having a reforming catalyst inside, in which a part of a raw fuel is partially oxidized (burned) with air inside the flow passage, and the obtained high temperature gas to be reformed is reformed into a hydrogen enriched gas using a reforming catalyst bed. The fuel reforming apparatus of the direct heat exchange type is used in the chemical industry.

Gas turbine electric power generating systems having a fuel reforming apparatus are disclosed in, for example, Japanese Patent Application Laid-Open No. 2-286835 (1990), Japanese Patent Application Laid-Open No. 5-332166 (1993), Japanese Patent Application Laid-Open No. 5-332167 (1993).

Since a fuel reforming apparatus of the indirect heat exchange type described above has a burner for heating the reactor pipe, the size of the apparatus is rather large. Further, if the exhaust gas of the turbine is used for the heat source, it is difficult to obtain the reforming temperature of approximately 700° C. required for the reforming reaction. In other words, taking efficiency into consideration, the exhaust gas temperature of the gas turbine is generally set to nearly 600° C. in the highest case and around 500° C. in a common case. Therefore, it is difficult to obtain the reforming temperature of approximately 700° C. required for the reforming reaction.

On the other hand, the fuel reforming apparatus of the direct heat exchange type is small in size, since a part of the raw fuel is partially oxidized (burned) and the sufficiently high reforming temperature required for the reforming reaction can be obtained. Therefore, the fuel reforming apparatus of the direct heat exchange type is better than the fuel reforming apparatus of the indirect heat exchange type.

The inventors have tried to apply the fuel reforming apparatus of the direct heat exchange type to a gas turbine electric power generating system, but the following problem was revealed. That is, in the fuel reforming apparatus of the direct heat exchange type, the fuel flow passage in which the partial oxidization (burning) occurs is formed of firebricks, and the heat load fluctuation applied to the firebricks is small in a fuel reforming apparatus in the chemical industry, where it is used for a long period of time under a constant operating condition. Therefore, cracks hardly occur in the firebricks under such constant load conditions. On the other hand, the heat load fluctuation applied to the firebricks is large in a gas turbine electric power generating system, and so cracks are apt to occur in the firebricks with such load fluctuation. Therefore, if the conventional fuel reforming apparatus of the direct heat exchange type is directly applied to a gas turbine electric power generating system, there is a possibility that cracks in the firebricks will result. In addition to this, there is a possibility that a secondary failure due to fracture of the broken firebrick will occur. The disclosed gas turbine electric power generating system described above therefore employs a fuel reforming apparatus of the indirect heat exchange type.

SUMMARY OF THE INVENTION

The present invention has been developed for the purpose of solving the above problems, and the object of the present invention is to provide a highly reliable fuel reforming apparatus which can be applied to a gas turbine electric power generating system having a large load fluctuation. At the same time, the object of the present invention is to provide a highly reliable electric power generating system using the fuel reforming apparatus.

In order to obtain a fuel reforming apparatus which is capable of attaining the above object, according to the present invention, a fuel reforming apparatus is constructed as follows.

A fuel reforming apparatus comprises a first chamber having a reforming catalyst bed inside, and a second chamber for introducing a cooling medium into the first chamber, the second chamber being arranged adjacent to the first chamber.

A fuel reforming apparatus comprises a first chamber for obtaining a gas to be reformed by partially oxidizing a raw fuel and for obtaining a reformed gas by reforming the gas to be reformed using a reforming catalyst bed installed therein, and a second chamber for introducing a cooling medium into the first chamber, the second chamber being arranged adjacent to the first chamber.

A fuel reforming apparatus comprises a fuel flow passage for obtaining a gas to be reformed by partially oxidizing a raw fuel and for obtaining a reformed gas by reforming the gas to be reformed using a reforming catalyst bed installed therein, and a cooling jacket for introducing a cooling medium into the fuel flow passage through several positions, cooling jacket being arranged adjacent to the fuel flow passage upstream of the reforming catalyst bed.

A fuel reforming apparatus comprises a fuel flow passage for obtaining a gas to be reformed by partially oxidizing a raw fuel and for obtaining a reformed gas by reforming the gas to be reformed using a reforming catalyst bed installed therein, a cooling jacket for introducing a cooling medium into the fuel flow passage through several positions, the cooling jacket being arranged adjacent to the fuel flow passage upstream of the reforming catalyst bed, and a flow straightener being provided upstream of the reforming catalyst bed.

The flow straightener described above holds a combustion catalyst.

A fuel reforming apparatus comprises a fuel flow passage for obtaining a gas to be reformed by partially oxidizing a raw fuel and for obtaining a reformed gas by reforming the gas to be reformed using a reforming catalyst bed installed therein, and a cooling jacket for introducing a cooling medium into the fuel flow passage through several positions, the cooling jacket being arranged adjacent to the fuel flow passage upstream of the reforming catalyst bed, and the fuel flow passage being composed of a plurality of fuel flow passages having different diameters.

A fuel reforming apparatus comprises a first chamber for obtaining a gas to be reformed by partially oxidizing a raw fuel and for obtaining a reformed gas by reforming the gas to be reformed using a reforming catalyst bed installed therein, a second chamber for introducing into the first chamber a first medium for cooling the first chamber, the second chamber being arranged adjacent to the first chamber, and swirling means for giving a swirl to a second medium supplied to the first chamber, the swirling means being provided upstream of the reforming catalyst bed.

In order to obtain an electric power generating system capable of attaining the object described above, according to the present invention, an electric power generating system is constructed as follows.

An electric power generating system comprises a burner for obtaining a burned gas by burning a fuel, a turbine driven with the burned gas obtained in the burner, and an exhaust heat recovery boiler for generating steam using the exhaust gas from the turbine, which system further comprises a fuel reforming apparatus being cooled with the steam obtained from the exhaust heat recovery boiler and obtaining the fuel supplied to the burner.

An electric power generating system comprises a burner for obtaining a burned gas by burning a fuel, a turbine driven with the burned gas obtained in the burner, and an exhaust heat recovery boiler for generating steam using the exhaust gas from the turbine, which system further comprises a fuel reforming apparatus, being cooled with the steam obtain from the exhaust heat recovery boiler, for adjusting the temperature of a gas to be reformed with the cooling steam and obtaining the fuel supplied to the burner.

An electric power generating system comprises a burner for obtaining a burned gas by burning a fuel with compressed air, a turbine driven with the burned gas obtained in the burner, and an exhaust heat recovery boiler for generating steam using the exhaust gas from the turbine, which system further comprises a fuel reforming apparatus, being cooled with the compressed air and the steam obtain from the exhaust heat recovery boiler, for adjusting the temperature of a gas to be reformed with the cooling steam and obtaining the fuel supplied to the burner.

According to the fuel reforming apparatus of the present invention as described above, the fuel flow passage is cooled from the outside by introducing a cooling medium of steam into a second chamber of a cooling jacket arranged adjacent to the first chamber of the fuel flow passage. By doing so, the fuel flow passage exposed to high temperature reformed gas can be protected from the high temperature reformed gas.

The steam, after cooling the cooling jacket, is introduced into the fuel flow passage through several positions of the cooling jacket. By doing so, the temperature of the reformed gas flowing into the reforming catalyst bed is adjusted to a temperature suitable for reforming in the reforming catalyst bed.

According to a fuel reforming apparatus of the present invention, the reformed gas is introduced into a reforming catalyst bed through a flow straightener provided upstream of the reforming catalyst bed. By doing so, the velocity distribution domain, the temperature distribution domain and the fuel concentration domain formed in the reformed gas become uniform with respect to the direction of gas flow. Further, since a combustion catalyst is held to the flow straightener, the small amount of the oxygen in the air contained in the reformed gas is completely burned.

According to a fuel reforming apparatus of the present invention, since the fuel flow passage is composed of a plurality of fuel flow passages having different diameters, the thermal stress acting on the fuel flow passage due to expansion and contraction differences can be small enough to be allowed.

According to a fuel reforming apparatus of the present invention, a cooling medium of air is introduced into the cooling jacket to cool the fuel flow passage from the outside. Further, steam is supplied to the fuel flow passage through a swirl means. The supplied steam widely expands inside the fuel flow passage to cool the fuel flow passage from the inside. By doing so, the fuel flow passage exposed to a high temperature reformed gas can be protected from the high temperature reformed gas. The steam is mixed with the reformed gas. Therefore, the temperature of the reformed gas flowing into the reforming catalyst bed is adjusted to a temperature suitable for reforming in the reforming catalyst bed.

According to the electric power generating system described above, the fuel reforming apparatus is cooled by the steam generated in the exhaust heat recovering boiler or the compressed air. By doing so, even if a fluctuation in the thermal load occurs due to the load fluctuation of the gas turbine, fuel gas to be supplied to the burner can be obtained while the fuel reforming apparatus is being protected against the heat.

DESCRIPTION OF EMBODIMENTS

The present invention will be described in detail below, referring to the accompanying drawings.

Figure 1:
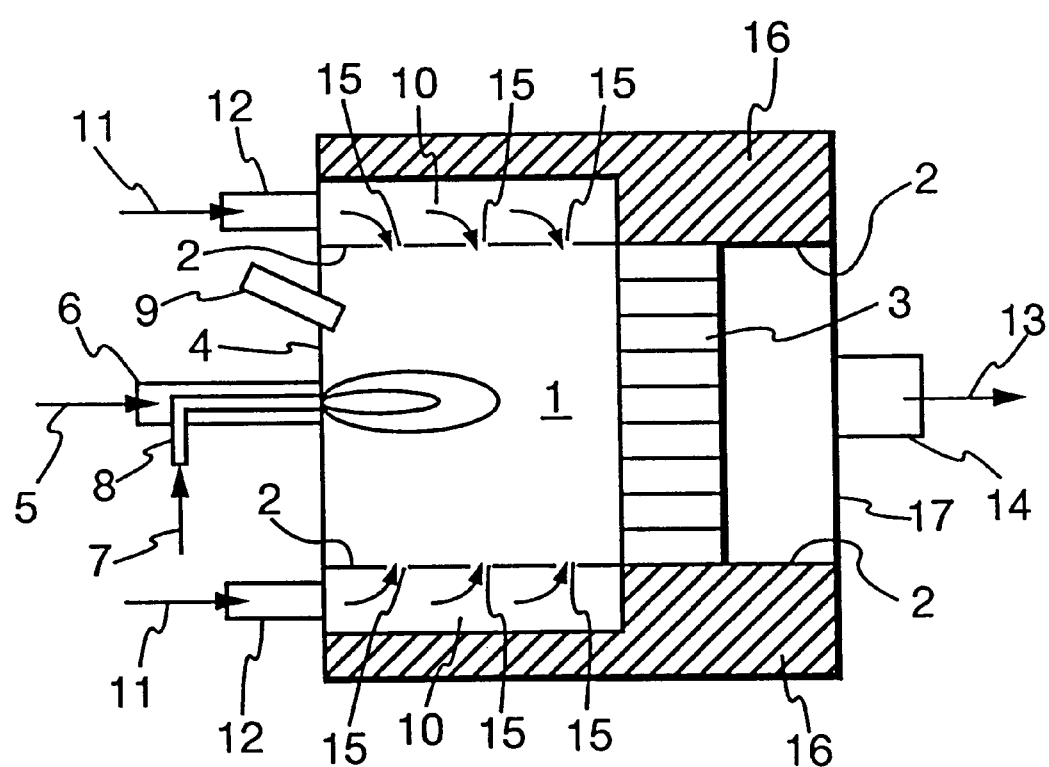
FIG. 1 is a diagrammatic cross-sectional view of a first embodiment of a fuel reforming apparatus in accordance with the present invention taken on a plane including the axial line of the fuel reforming apparatus.

FIG. 1 is a cross-sectional view of a first embodiment of a fuel reforming apparatus in accordance with the present invention taken on a plane including the axial line of the fuel reforming apparatus.

A cylindrical fuel reforming apparatus covered with a thermal insulating layer 16 comprises a fuel flow passage 1 contoured by a cylindrical contour wall 2 in its central axial direction and a reforming catalyst bed 3 in the middle of the flow passage for reforming gas flowing from upstream of the fuel flow passage 1 into a proper reformed gas. The thermal insulating layer 16 has a role for shielding heat radiated from the fuel reforming apparatus, and is constructed of a heat insulator made of glass wool or ceramic wool having a small thermal conductivity. The reforming catalyst bed 3 is made of a nickel alloy having a better reforming characteristic to hydrocarbon and being low in cost.

Herein, the word "contour" means to determine a contour or a shape of a substance, and the term "contour wall" refers to a wall which determines a contour or a shape of a substance.

A cooling jacket 10 is arranged upstream of the reforming catalyst bed 3 so as to surround the fuel flow passage 1 and is supplied with steam 11 for cooling the cylindrical contour wall 2. There are provided in the cylindrical contour wall 2 upstream of the reforming catalyst bed 3 a plurality of injection nozzles 15 communicating the cooling jacket 10 with the fuel flow passage 1 so that the steam 11 introduced into the cooling jacket 10 is allowed to flow into the fuel flow passage 1.

A fuel supply pipe 6, through which a mixed gas 5, which is obtained by mixing a fuel such as hydrocarbon with steam in a proper ratio, is supplied to the fuel flow passage 1 from the outside, is connected nearly to the central portion of an end surface 4 on the upstream side of the fuel reforming apparatus. An air supply pipe 8 for supplying air 7 from the outside into the fuel flow passage 1 is arranged inside the fuel supply pipe 6 nearly on its center axis. At the end surface 4 on the upstream side, a plurality of cooling medium supply pipes 12 for supplying the steam 11 from the outside into the cooling jacket 10 are connected in the peripheral direction of the fuel reforming apparatus along the cooling jacket 10. The reference character 9 denotes a spark plug for igniting the gas supplied into the fuel flow passage 1.

A fuel outlet pipe 14 for exhausting hydrogen enriched gas 13 which is reformed by the reforming catalyst bed 3 is connected to nearly the central portion of the end surface 17 on the down stream side of the fuel reforming apparatus.

The fuel reforming apparatus according to the present invention is constructed as described above, and operates as follows.

A mixed gas 5, such as hydrocarbon (methane in this embodiment) and steam in a proper ratio, is supplied to the fuel flow passage 1 through the fuel supply pipe 6, and air 7 is supplied to the fuel flow passage 1 through the air supply pipe 8. The mixed gas 5 and the air supplied to the fuel flow passage 1 are ignited with the spark plug 9 to be burned diffusely. Therein, since the flow rate of the air 7 supplied to the fuel flow passage 1 through the air supply pipe 8 is an amount sufficient to burn approximately 20% of the supplied mixed gas 5 (the methane fuel), the mixed gas is partially oxidized (partial combustion) and a high temperature gas containing unburned gas to be reformed can be obtained.

Although the mixed gas 5 supplied to the fuel flow passage 1 through the fuel supply pipe 6 is obtained by mixing a fuel, such as a hydrocarbon, and steam in a proper ratio in advance, the mixing may be carried out before supplying the mixture to the fuel supply pipe 6, or a fuel, such as a hydrocarbon, and steam may be separately supplied to the fuel supply pipe 6 to be mixed therein.

On the other hand, steam 11 is supplied into the cooling jacket 10 through the cooling medium supply pipes 12. The steam 11 supplied to the cooling jacket 10 cools the cylindrical contour wall 2 which is exposed to the high temperature gas to be reformed, obtained through the combustion described above, from the outside of the cylindrical contour wall.

The steam 11 supplied to the cooling jacket 10, after cooling the cylindrical contour wall 2, is injected into the fuel flow passage 1 through the plurality of injecting nozzles 15 which provide communication between the cooling jacket 10 and the fuel flow passage 1 so as to be mixed with the high temperature gas to be reformed, which has been obtained through the combustion. By doing so, the temperature of the high temperature gas to be reformed is adjusted to a temperature suitable for the reforming catalyst bed 3, that is, a temperature suitable for reforming, and the high temperature gas to be reformed is allowed to flow into the reforming bed 3.

In the reforming catalyst bed 3, a chemical reaction expressed by the following equation occurs to reform the gas to a hydrogen enriched gas 13. This reforming reaction is called a steam reforming reaction of methane, which is an endothermic chemical reaction to change a mixed gas of methane and steam into a hydrogen enriched gas.

$$CH_4 + sH_2O \rightarrow hH_2 + c_1CO + c_2CO_2 - \Delta Q \qquad (1)$$

where, $s$, $h$, $c_1$, $c_2$ are constants and $\Delta Q$ is reaction heat.

The hydrogen enriched gas 13 obtained in such a manner is supplied to an external apparatus through the fuel outlet pipe 14.

According to this embodiment, since the cooling jacket 10 is provided so as to surround the fuel flow passage 1 formed by the cylindrical contour wall 2 and be supplied with the steam 11 for cooling the cylindrical contour wall 2, the cylindrical contour wall 2 is cooled with the steam 11 from the outside. Therefore the cylindrical contour wall 2, which is heated to a high temperature by the high temperature gas to be reformed, can be protected by the cooling. By doing so, the reliability against high temperature in the fuel reforming apparatus can be improved. In more detail, the cylindrical contour wall 2 directly exposed to the gas obtained through the partial oxidization (combustion) is heated up to nearly 1100° C. On the other hand, the cooling jacket 10 is supplied with steam at 350° C. to 450° C. In this manner, the temperature of the cylindrical contour wall 2 directly exposed to the high temperature gas can be suppressed to nearly 700° C. Therefore, the cylindrical contour wall 2 may be formed of a material capable of withstanding a temperature of around 700°.

According to this embodiment, since the plurality of injecting nozzles 15, which communicate the cooling jacket 10 with the fuel flow passage 1, are provided in the cylindrical contour wall 2 and the steam 11, after cooling the cylindrical contour wall 2, is injected into the fuel flow passage 1 through the plurality of injecting nozzles 15, the temperature of the gas to be reformed can be adjusted by the air 7 partially oxidizing (partially burning) the mixed gas 5 and the steam 11 after cooling the cylindrical contour wall 2. By doing so, even if an activity change (for example, activity degradation) occurs in the reforming catalyst, the reforming rate in the reforming catalyst bed 3 can be kept constant by adjusting the temperature of the gas to be reformed using the air 7 and the steam 11. Therefore, the controllability of the fuel reforming apparatus can be matched with the performance of the fuel reforming apparatus.

Since it is possible to set the steam-carbon ratio s ($H_2O$/ $CH_4$ molecular ratio) in the reforming reaction in the reforming catalyst bed 3, that is, the reaction expressed by the aforementioned equation (1) to 4.0 by mixing the steam 11, after cooling the cylindrical contour wall 2, with the gas to be reformed, the reaction expressed by the equation (1) described above can be promoted. Therefore, the efficiency of the reforming in the reforming catalyst bed 3 can be improved.

According to this embodiment, since a diffuse combustion is employed as the combustion method, the mixing gas 5 supplied through the fuel supply pipe 6 and the air 7 supplied through the air supply pipe 8 are certainly ignited. That is, when the mixed gas 5 (fuel) and the air are separately supplied, the concentration distribution of the fuel is widely distributed in the range from 0% (100% air) to 100% (0% air). On the other hand, each different kind of fuel has its own proper combustion range, that is, a fuel concentration range to maintain burning. For example, the combustion range of methane fuel in this embodiment in air (under condition of room temperature and normal pressure) is 5.0% to 15.0% in volume concentration unit. Therefore, by employing diffuse combustion, the range of the mixed fuel is certainly within the combustion range and can be certainly ignited. Therefore, the reliability for combustion in the fuel flow passage 1 of the fuel reforming apparatus can be improved.

Figure 2:
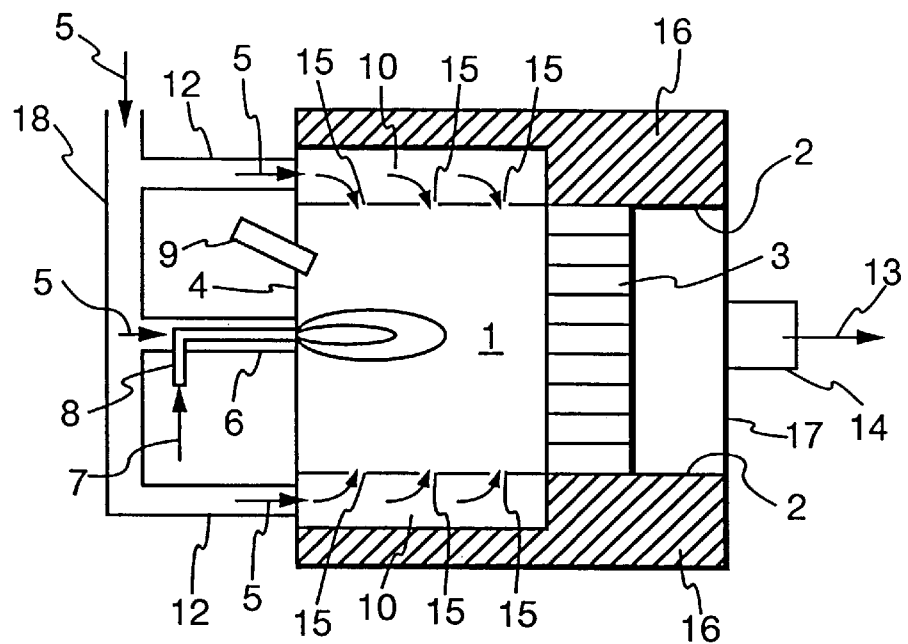
FIG. 2 is a diagrammatic cross-sectional view of a second embodiment of a fuel reforming apparatus in accordance with the present invention taken on a plane including the axial line of the fuel reforming apparatus.

FIG. 2 is a cross-sectional view of a second embodiment of a fuel reforming apparatus in accordance with the present invention, taken on a plane including the axial line of the fuel reforming apparatus, which second embodiment is a modification of the apparatus shown in FIG. 1. Accordingly, only different points with respect to the apparatus of FIG. 1 will be described below.

In this embodiment, the mixed gas 5 formed by mixing fuel, such as a hydrocarbon and steam, in a proper ratio, that is, a gas having the same composition as the mixed gas 5 supplied into the fuel flow passage 1 through the fuel supply pipe 6, is used as the cooling medium introduced into the cooling jacket 10.

Therefore, in the fuel reforming apparatus of this embodiment, a fuel supply pipe 6 and a plurality of cooling medium supply pipes 12 in the end surface 4 are connected to a main fuel pipe 18. Since the other portions are the same as those of FIG. 1, a description of the other portions will be omitted here.

By constructing the apparatus as described above, a mixed gas 5 formed by mixing a fuel, such a hydrocarbon (methane in this embodiment) and steam in a proper ratio, is supplied to the fuel flow passage 1 through the main fuel pipe 18 and the fuel supply pipe 6, and air 7 is supplied to the fuel flow passage 1 through the air supply pipe 8. The mixed gas 5 and the air supplied to the fuel flow passage 1 are ignited by the spark plug 9 to be burned diffusely. Therein, since the flow rate of the air 7 supplied to the fuel flow passage 1 through the air supply pipe 8 is sufficient to burn approximately 20% of the supplied mixed gas 5 (the fuel methane), the mixed gas is partially oxidized (partial combustion) and a high temperature gas containing unburned gas to be reformed can be obtained.

On the other hand, the mixed gas 5 is supplied into the cooling jacket 10 through the main fuel pipe 18 and the cooling medium supply pipe 12. The mixed gas 5 supplied to the cooling jacket 10 cools the cylindrical contour wall 2 exposed to the high temperature gas obtained through the combustion described above from the outside of the cylindrical contour wall 2.

Although the mixed gas 5 supplied to the fuel flow passage 1 through the main fuel pipe 18 and the fuel supply pipe 6 and the mixed gas 5 supplied into the cooling jacket 10 through the cooling medium supply pipe 12 are obtained by mixing a fuel, such as a hydrocarbon, and steam in a proper ratio in advance, the mixing may be carried out before supplying the mixture to the main fuel pipe 18, or a fuel, such as a hydrocarbon, and steam may be separately supplied to the main fuel pipe 18 to be mixed therein.

The mixed gas 5 supplied to the cooling jacket 10 after cooling the cylindrical contour wall 2 is injected into the fuel flow passage 1 through the plurality of injecting nozzles 15, which provide communication between the cooling jacket 10 and the fuel flow passage 1 so as to be mixed with the high temperature gas obtained through the combustion. By doing so, the temperature of the high temperature gas to be reformed is adjusted to a temperature suitable for the reforming catalyst bed 3, that is, a temperature suitable for reforming. Then, the high temperature gas to be reformed is allowed to flow into the reforming bed 3 to be reformed according to the reaction expressed by the equation (1).

According to this embodiment, since the fuel supply pipe 6 and the cooling medium supply pipe 12 are connected to the main fuel pipe 18 in common and the mixed gas 5 is supplied into the cooling jacket 10, the cylindrical contour wall 2 is cooled by the mixed gas 5 from the outside. Therefore, the cylindrical contour wall 2, which is heated to a high temperature by the high temperature gas to be reformed, can be protected by the cooling. By doing so, the reliability against high temperature in the fuel reforming apparatus can be improved.

Since the mixed gas 5 is supplied to the cooling jacket 10, the fuel concentration in the mixed gas 5 conducted to the fuel flow passage 1 through fuel supply pipe 6 is more dilute than the fuel concentration in the mixed gas 5 conducted to the fuel flow passage through the fuel supply pipe 6 in the first embodiment. That is, assuming that the fuel flow rate and the steam flow rate conducted to the fuel reforming apparatus in the first embodiment are set to the same flow rates as those conducted to the fuel reforming apparatus in this embodiment, all of the fuel supplied from the fuel supply pipe 6 is conducted to the fuel reforming apparatus in the fuel reforming apparatus in the first embodiment. In other words, the fuel is not conducted to the cooling jacket 10. On the other hand, since a part of the fuel is conducted to the cooling jacket 10 in this embodiment, the amount of fuel entering into the fuel flow passage 1 through the fuel supply pipe 6 is less (more dilute).

Consequently, a local high temperature region is hardly formed in the high temperature gas containing unburned gas formed in the fuel flow passage 1, and accordingly the cylindrical contour wall 2 is protected from the high temperature gas to be reformed. Thereby, the reliability with respect to high temperature in the fuel reforming apparatus can be further improved.

Further, according to the present invention, since the plurality of injecting nozzles 15 which connect the cooling jacket 10 with the fuel flow passage 1 are provided in the cylindrical contour wall 2 and the mixed gas 5 supplied to the cooling jacket 10 is injected into the fuel flow passage 1 through the plurality of injecting nozzles 15, the gas to be reformed and the mixed gas 5 are mixed with each other. Therefore, the uniformity of mixing between the fuel and the steam in the gas to be reformed entering into the reforming catalyst bed 3 is improved, and accordingly a uniform reaction can be obtained in the reforming catalyst bed 3. Thereby, the performance of the fuel reforming apparatus can be improved.

Figure 3:
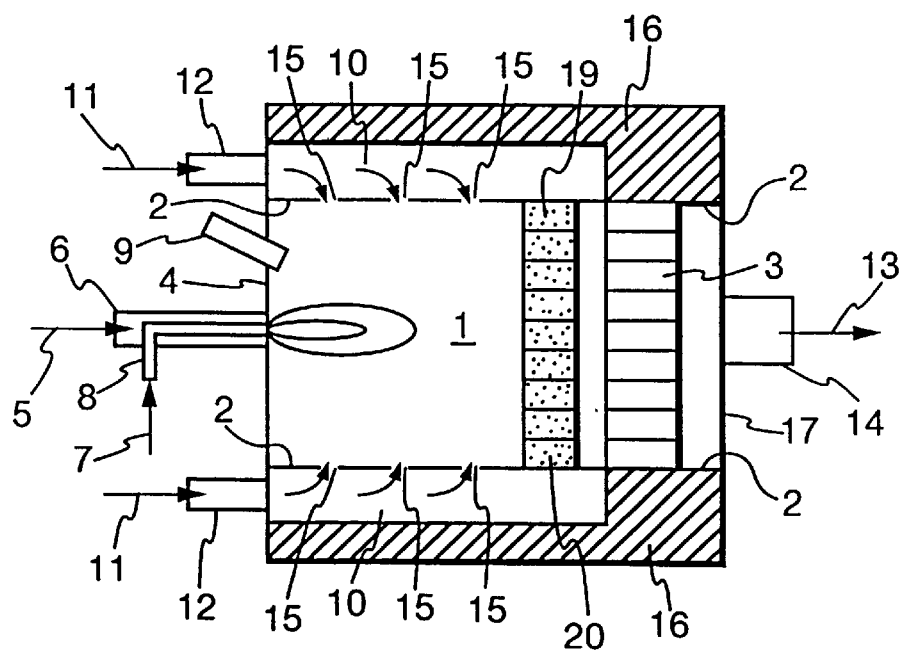
FIG. 3 is a diagrammatic cross-sectional view of a third embodiment of a fuel reforming apparatus in accordance with the present invention taken on a plane including the axial line of the fuel reforming apparatus.

FIG. 3 is a cross-sectional view of a third embodiment of a fuel reforming apparatus in accordance with the present invention, taken on a plane including the axial line of the fuel reforming apparatus, which third embodiment is a modification of the apparatus shown in FIG. 1. Accordingly, only different points with respect to the apparatus of FIG. 1 will be described below.

In this embodiment, a flow straightener 19 formed with a plurality of vanes in a honeycomb shape is provided upstream of the reforming catalyst bed 3 contained inside the fuel flow passage 1. In the fuel flow passage 1, the velocity distribution domain, the temperature distribution domain and the fuel distribution domain are all formed in the high temperature gas to be reformed, which contains unburned gas obtained by partial oxidization (partial combustion) of the mixed gas 5 and the air 7. Therefore, if the gas to be reformed in such a state enters into the reforming catalyst bed 3, a uniform reforming reaction can not be obtained, which leads to a non-uniform temperature distribution and a non-uniform temperature distribution. In this embodiment, the flow straightener 19 is provided upstream of the reforming catalyst 3 in order to prevent this phenomenon.

By constructing the apparatus in such a manner, the high temperature gas to be reformed, containing unburned gas obtained by combustion, is adjusted to a proper temperature suitable for the reforming catalyst bed 3 (temperature suitable for reforming) by the steam 11 in the cooling medium injected through the plurality of injecting nozzles 15 (the mixed gas 5 supplied into the fuel flow passage 1 through the fuel supply pipe 6 may be used instead) and is allowed to flow to the downstream side of the fuel flow passage 1. Therein, since the gas to be reformed passes through the flow straightener 19, the velocity distribution domain, the temperature distribution domain and the fuel distribution domain formed in the gas to be reformed are made uniform with respect to the direction of the gas flow and the gas to be reformed is allowed to flow into the reforming catalyst bed 3.

According to this embodiment, since the flow straightener 19, formed with a plurality of vanes in a honeycomb shape, is provided upstream of the reforming catalyst bed 3 contained inside the fuel flow passage 1 and the gas to be reformed is passed through the flow straightener 19 before entering the reforming catalyst bed 3, the velocity distribution domain, the temperature distribution domain and the fuel distribution domain formed in the gas to be reformed are made uniform with respect to the direction of the gas flow. Accordingly, the heat load due to the reaction per unit volume of the reforming catalyst bed 3 is made uniform and consequently the life of the reforming catalyst bed 3 can be extended. Thereby, the reliability of the reforming apparatus can be improved.

A further improvement described below is added to this embodiment.

The flow straightener 19 holds a combustion catalyst 20. In more detail, the flow straightener 19 holds a combustion catalyst 20 having an active component such as palladium, platinum or the like. In this case, it is preferable for the flow straightener 19 to be made of a high heat resistant ceramic, such a lanthanum-β-alumina.

In the high temperature gas to be reformed, containing unburned gas obtained by partial oxidization, a small amount of oxygen in the air remains. If the gas to be reformed in this state enters into the reforming to catalyst bed 3, the reforming catalyst will be oxidized by the remaining oxygen in the air and consequently a reforming reaction cannot be performed sufficiently. In order to prevent this, according to this embodiment, the flow straightener 19 holds a combustion catalyst 20 having an active component such as palladium, platinum or the like.

Furthermore, in order for the flow straightener 19 to be able to withstand the combustion temperature of the combustion catalyst 20, the flow straightener 19 may be made of a high temperature resistant ceramic, such as lanthanum-β-alumina or the like.

By constructing the apparatus in such a manner, the high temperature gas to be reformed, containing unburned gas obtained by combustion, is adjusted to a proper temperature suitable for the reforming catalyst bed 3 (temperature suitable for reforming) by the steam of the cooling medium injected through the plurality of injecting nozzles 15 (the mixed gas 5 is supplied into the fuel flow passage 1 through the fuel supply pipe 6 may be used instead) and is allowed to flow to the downstream side of the fuel flow passage 1. Therein, since the gas to be reformed passes through the flow straightener 19, the velocity distribution domain, the temperature distribution domain and the fuel distribution domain formed in the gas to be reformed are made uniform with respect to the direction of the gas flow and the gas to be reformed is allowed to flow into the reforming catalyst bed 3.

According to this embodiment, since the flow straightener 19 holds the combustion catalyst 20 having an active component such as palladium, platinum or the like and the gas to be reformed is passed through the flow straightener 19 before entering the reforming catalyst bed 3, the small amount of oxygen in the air remaining in the gas to be reformed after the partial oxidization is completely burned. Thereby, the oxidization of the reforming catalyst bed 3 by the small amount of oxygen in the air remaining in the gas to be reformed can be prevented and the reforming reaction can be performed sufficiently.

Since the flow straightener 19 is made of a high temperature resistant ceramic, such a lanthanum-β-alumina or the like, in order that the flow straightener 19 will withstand the combustion temperature of the combustion catalyst 20, the flow straightener 19 can be prevented from deformation due to high temperature. Therefore, the performance and the reliability of the reforming apparatus can be improved.

Figure 4:
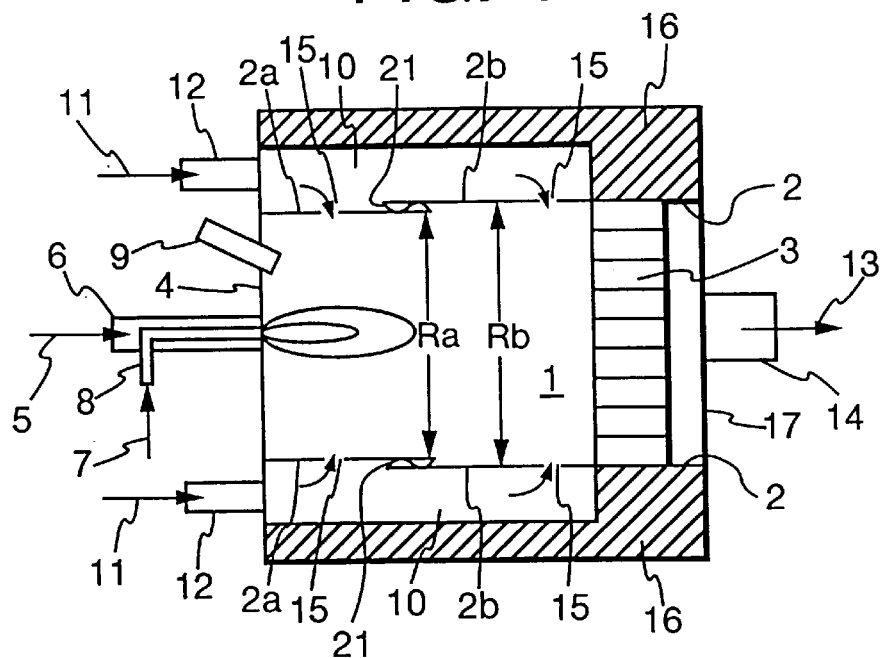
FIG. 4 is a diagrammatic cross-sectional view of a fourth embodiment of a fuel reforming apparatus in accordance with the present invention taken on a plane including the axial line of the fuel reforming apparatus.

FIG. 4 is a cross-sectional view of a fourth embodiment of a fuel reforming apparatus in accordance with the present invention, taken on a plane including the axial line of the fuel reforming apparatus, which fourth embodiment is a modification of the apparatus shown in FIG. 1. Accordingly, only different points with respect to the apparatus of FIG. 1 will be described below.

In this embodiment, the fuel flow passage 1 is composed of a first cylindrical contour wall 2a and a second cylindrical contour wall 2b having different diameters from each other. In more detail, the diameter Ra of the first cylindrical contour wall 2a is smaller than the diameter Rb of the second cylindrical contour wall 2b, and the end portions of the cylindrical contour walls having different diameters from each other are slipped over one another to couple together. Since a gap is formed in the overlapping portion of the cylindrical contour walls having different diameters, a ring-shaped flare-seal 21 having an S-shaped cross section is provided in the gap portion to elastically support the two cylindrical contour walls having different diameters.

As for the diameters, Ra is 350 mm, Rb is 370 mm and the gap is nearly 10 mm.

The flare-seal 21 is commonly called a spring seal, the line contact in the peripheral direction of which prevents fluid from leaking through a gap formed when two cylindrical contour walls having different diameters are slipped over each other to couple together. The flare-seal 21 has slit-shaped cuts in the axial direction to provide the seal with elasticity.

Since the cylindrical contour wall 2 is cooled from the outside by the steam 11 supplied to the cooling jacket 10 (the mixed gas 5 supplied into the fuel flow passage 1 through the fuel supply pipe 6 may be used instead) and heated for the inside by the high temperature gas to be reformed, both an expansion stress and a contraction stress act on the cylindrical contour wall 2. In the fuel reforming apparatuses shown in FIG. 1 to FIG. 3, when the difference between the expansion and the contraction stresses is too large, the stresses exert a bad influence on the other components of the apparatus or damage the cylindrical contour wall itself because the cylindrical wall 2 has a small expandability. In this embodiment, the fuel flow passage 1 is composed of the first cylindrical contour wall 2a and the second cylindrical contour wall 2b having different diameters from each other to give the cylindrical contour wall the possibility of movement against the expansion and contraction difference.

According to this embodiment, since the fuel flow passage 1 is composed of the first cylindrical contour wall 2a and the second cylindrical contour wall 2b having different diameters from each other, an expansion and contraction difference due to thermal stress acting on the cylindrical contour wall 2 is permissible. Thereby, the stress does not exert a bad influence on the other components of the apparatus and degradation in strength of the cylindrical contour wall itself can be prevented, which improves the life of the apparatus. Accordingly, the reliability of the fuel reforming apparatus inspite of the heat can be improved.

Figure 5:
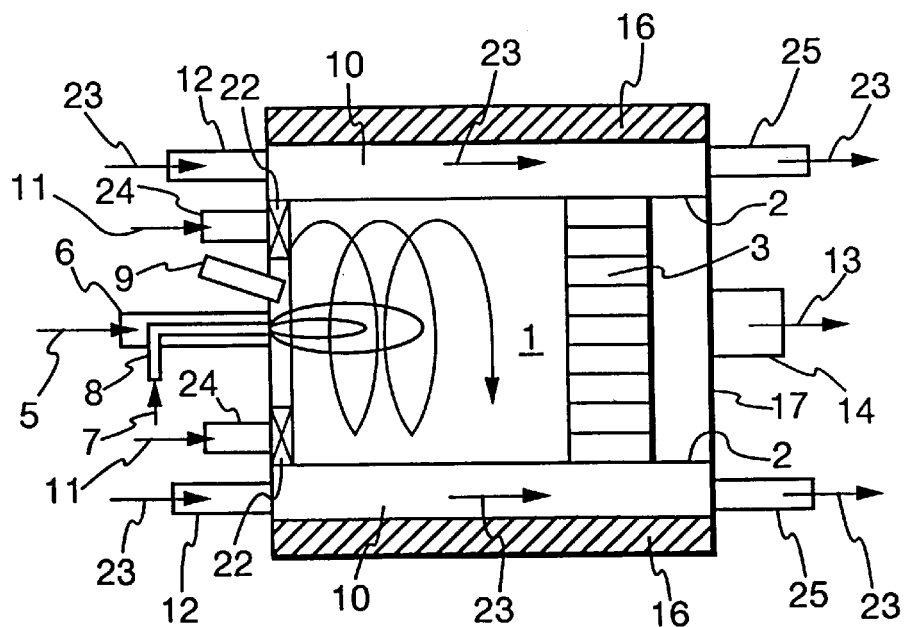
FIG. 5 is a diagrammatic cross-sectional view of a fifth embodiment of a fuel reforming apparatus in accordance with the present invention taken on a plane including the axial line of the fuel reforming apparatus.

FIG. 5 is a cross-sectional view of a fifth embodiment of a fuel reforming apparatus in accordance with the present invention, taken on a plane including the axial line of the fuel reforming apparatus.

A cylindrical fuel reforming apparatus covered with a thermal insulating layer 16 comprises a fuel flow passage 1 contoured by a cylindrical contour wall 2 extending along its central axial direction and a reforming catalyst bed 3 disposed in the middle of the flow passage 1 for reforming gas flowing from upstream of the fuel flow passage 1 into a proper reforming gas. A cooling jacket 10 is arranged around the fuel flow passage 1 so as to surround the fuel flow passage 1 and is arranged to be supplied with air 23 for cooling the cylindrical contour wall 2.

The thermal insulating layer 16 has a role for shielding heat radiated from the fuel reforming apparatus, and is constructed of a heat insulator made of glass wool or ceramic wool having a small thermal conductivity. The reforming catalyst bed 3 is made of a nickel alloy having a better reforming characteristic to hydrocarbon and is low in cost.

A fuel supplying pipe 6, through which a mixed gas 5 obtained by mixing a fuel, such as a hydrocarbon, with steam in a proper ratio is supplied to the fuel flow passage 1 from the outside, is connected nearly to the central portion of an end surface 4 on the upstream side of the fuel reforming apparatus, and an air supply pipe 8 for supplying air 7 from the outside into the fuel flow passage 1 is arranged inside the fuel supply pipe 6 nearly on its center axis. A plurality of steam supply pipes 24 for supplying steam 11 from the outside into the fuel flow passage 1 are arranged around the fuel supplying pipe 6, and a plurality of cooling medium supply pipes 12 for supplying air 23 from the outside into the cooling jacket 10 arranged in the peripheral direction of the fuel reforming apparatus along the cooling jacket 10 are connected to the end surface 4. The reference character 9 denotes a spark plug for igniting the gas supplied into the fuel flow passage 1.

A fuel outlet pipe 14 for exhausting hydrogen enriched gas 13, obtained by reforming in the reforming catalyst bed 3, is connected to nearly the central portion of the end surface 17 on the down stream side of the fuel reforming apparatus. A number of cooling medium outlet pipes 25 for supplying the air 23 introduced into the cooling jacket 10 to the outside, arranged in the peripheral direction of the fuel reforming apparatus along the cooling jacket 10, are connected to the end surface 17.

In order to give a swirl to the stream 11 supplied in the fuel flow passage 1 through the plurality of steam supply pipes 24, a swirl device 22 is arranged so as to surround circularly the fuel supply pipe 6 upstream of the reforming catalyst bed 3, that is, at the end portion of the fuel flow passage 1 (the end surface on the upstream side).

The fuel reforming apparatus according to the present invention is constructed as described above, and operates as follows.

A mixed gas 5 formed by mixing a fuel, such as a hydrocarbon (methane in this embodiment), and steam in a proper ratio is supplied to the fuel flow passage 1 through the fuel supply pipe 6, and air 7 is supplied to the fuel flow passage 1 through the air supply pipe 8. The mixed gas 5 and the air supplied to the fuel flow passage 1 are ignited by the spark plug 9 to be burned diffusely. Therein, since the flow rate of the air 7 supplied to the fuel flow passage 1 through the air supply pipe 8 is sufficient to burn approximately 20% of the supplied mixed gas 5 (the fuel of methane), the mixed gas is partially oxidized (partial combustion) and a high temperature gas containing unburned gas to be reformed can be obtained. In this embodiment, diffuse combustion having a wide stable combustion range is employed as the combustion method.

Although the mixed gas 5 supplied to the fuel flow passage 1 through the fuel supply pipe 6 is obtained by mixing a fuel, such as a hydrocarbon, and the steam in a proper ratio in advance, the mixing may be carried out before supplying the mixture to the fuel supply pipe 6, or a fuel, such as a hydrocarbon, and the steam may be separately supplied to the fuel supply pipe 6 to be mixed therein.

Steam 23 is supplied to the fuel flow passage 1 through the steam supply pipes 24. At this time, a swirl is given to the steam 23 by the swirl device 22 provided upstream of the reforming catalyst bed 3, that is, at the upstream end of the fuel flow passage 1 (in the end surface 4), and the steam is expanded widely. The steam 23 cools the cylindrical contour wall 2 exposed to the high temperature gas from the inside, and at the same time mixes with the high temperature gas containing unburned gas obtained by the combustion to adjust the high temperature gas containing unburned gas to a temperature suitable for the reforming catalyst bed 3, that is, a temperature suitable for the reforming.

On the other hand, steam 11 is supplied into the cooling jacket 10 through the cooling medium supply pipe 12. The steam 11 supplied to the cooling jacket 10 cools the cylindrical contour wall 2, which is exposed to the high temperature gas obtained through the combustion described above, from the outside of the cylindrical contour wall. The air 23 supplied into the cooling jacket 10 after cooling is supplied to the outside through the cooling medium outlet pipes 25.

The gas to be reformed, having been adjusted to a temperature suitable for the reforming catalyst bed 3, that is, a temperature suitable for the reforming, is reformed to a hydrogen enriched gas 13 by the reforming catalyst bed 3 and then supplied to an external apparatus through the fuel outlet pipe 14. The reforming reaction in the reforming catalyst bed 3 is performed through the same process expressed by the equation (1) described above.

According to this embodiment, since the cooling jacket 10 is arranged so as to surround the fuel flow passage 1 and air 23 is supplied into the cooling jacket 10, the cylindrical contour wall 2 is cooled by air 23 supplied to the cooling jacket 10 from the outside.

Since the swirl device 22 is provided upstream of the reforming catalyst bed 3, that is, at the upstream end of the fuel flow passage 1 (in the end surface 4) and a swirl is given to the steam 11 supplied into the fuel flow passage 1 through the steam supply pipes 24 to expand the steam 11 inside the fuel flow passage 1 widely, the cylindrical contour wall 2 is cooled by the steam 11 from the inside. By doing so, the cylindrical contour wall 2, which is exposed to the high temperature gas obtained by the combustion, is protected by being cooled both from the inside and from the outside. Therefore, the reliability of the reforming apparatus inspite of the high temperature is improved.

An embodiment of an electric power generating system having a fuel reforming apparatus in accordance with this invention will be described below.

Figure 6:
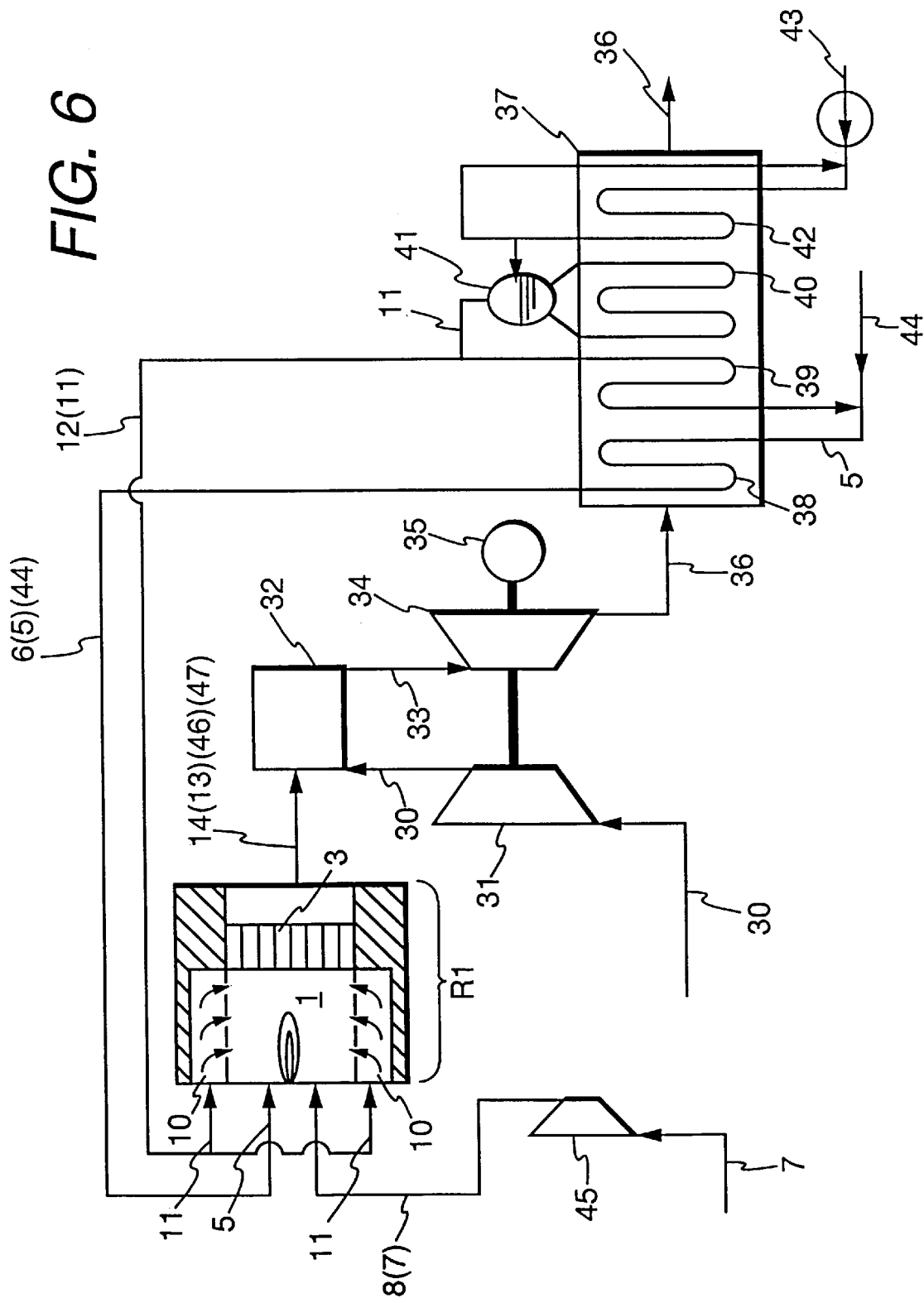
FIG. 6 is a system diagram showing an electric power generating plant having the fuel reforming apparatus of FIG. 1 in accordance with the present invention.

FIG. 6 is a system diagram showing an electric power generating plant having the fuel reforming apparatus of FIG. 1 in accordance with the present invention. This electric power generating system can be roughly classified into a gas turbine system, an exhaust heat recovering system and a fuel reforming system.

The gas turbine system comprises a burner 32 for producing high temperature combustion gas 33 by burning a mixture of combustion air 30, compressed by an air compressor 31, and fuel, and a gas turbine 34 driven by the high temperature combustion gas 33 obtained from the burner 32 for driving an electric power generator 35 directly coupled to the gas turbine 34.

The exhaust heat recovering boiler system comprises an exhaust heat recovering boiler 37 for producing steam by exchanging heat between the exhaust gas 36, exhausted from the gas turbine 34, and feed water. In the exhaust heat recovering boiler 37, a mixed gas heater 38, a steam heater 39, an evaporator 40 (drum 41), and an economizer 42 are arranged from the high pressure side of the exhaust gas 36 in this order.

The fuel reforming system comprises a fuel reforming apparatus R1 for producing a gas to be reformed by burning a mixed gas 5 supplied through a fuel supply pipe 6 and air 7 supplied from an air supply apparatus 45 (for example, a compressor) through an air supply pipe 8 and for producing a fuel gas 46 by reforming the gas to be reformed using a reforming catalyst bed 3. The reference character 12 denotes a cooling medium supply pipe for supplying steam 11 to a cooling jacket 10, and the reference character 14 denotes a fuel outlet pipe for supplying the fuel gas 46 supplied by the fuel reforming apparatus R1 to the burner 32.

The electric power generating system according to the present invention is constructed as described above, and operates as follows.

At the start of operation, a raw fuel 44 is supplied to the fuel flow passage 1 of the fuel reforming apparatus R1 through the fuel supply pipe 6 and the air 7 obtained by the air supplying apparatus 45 is supplied to the fuel flow passage 1 of the fuel reforming apparatus R1 through the air supply pipe 8. The supplied raw fuel 44 and the supplied air 7 are ignited by a spark plug (not shown) and burned so as to be changed to an unburned gas 47 having a temperature around several hundred degrees. The unburned gas 47 obtained in such a manner flows inside the fuel flow passage 1 toward the downstream end and is supplied to the burner 32 through the fuel outlet pipe 14. At this time, the unburned gas 47 heats the reforming catalyst bed 3 installed inside the fuel flow passage 1.

The unburned gas 47 supplied to the burner 32 is mixed with the combustion air 30 supplied from the air compressor 31. The combustion produces a high temperature burned gas 33, and the obtained gas 33 drives the gas turbine 34 and is exhausted from the gas turbine 34 as an exhaust gas after driving the gas turbine 34. The electric power generator 35, directly coupled to the gas turbine 34, is driven by the gas turbine 34.

The exhaust gas 36 exhausted from the gas turbine 34 is supplied to the exhaust heat recovering boiler 37 to exchange heat with the feed water 43. The feed water 43 is supplied to the economizer 42 by a pump so as to be preheated by the low pressure exhaust gas 36. The preheated feed water is supplied to the evaporator 40 (drum 41) and changed to steam 11 by being heated by the high pressure exhaust gas 36. The steam 11 is supplied to the cooling jacket 10 of the fuel reforming apparatus R1 through the cooling medium supply pipe 12 to cool the fuel flow passage 1 from the outside.

The steam 11 is also branched from the cooling medium supply pipe 12 and supplied to a steam heater 39 so as to be heated by the higher pressure exhaust gas 36. The heated steam 11 is mixed with the raw fuel 44 (methane is employed in this embodiment) and supplied to a mixed gas heater 38 so as to be heated by the highest pressure exhaust gas 36. The mixed gas 5 obtained in such a manner is supplied to the fuel flow passage 1 of the fuel reforming apparatus R1 through the fuel supply pipe 6.

The mixed gas 5 supplied to the fuel flow passage 1 is diffuse-burned (partially oxidized) with the air 7 supplied to the fuel flow passage through the air supply pipe 8. The high temperature gas obtained by the diffuse combustion is mixed with the steam 11, which has been supplied into the cooling jacket 10 and has cooled the fuel flow passage 1, and is adjusted to a temperature suitable for the reforming catalyst bed 3, that is, a temperature suitable for the reforming, and then is allowed to flow into the reforming catalyst bed 3. The gas is reformed by the catalyst bed 3 so as to be changed to the hydrogen enriched gas 13. The hydrogen enriched gas 13 obtained in such a manner is supplied to the burner 32 through the fuel outlet pipe 14. After this, the hydrogen enriched gas 13 is supplied to the burner 32 as a fuel gas.

According to this embodiment, since the steam 11 obtained from the exhaust heat recovering boiler 37 is supplied to the cooling jacket 10 of the fuel reforming apparatus R1 through the cooling medium supply pipe 12, the fuel flow passage of the fuel reforming apparatus R1 exposed to the high temperature gas is cooled by the steam 11 from the outside. Thereby, the fuel reforming apparatus R1 can be protected from high temperature heat even if the heat load is changed by the load fluctuation of the gas turbine 34. Therefore, the reliability of the electric power generating system can be improved.

Further, according to this embodiment, since the mixed gas heater 38 and the steam heater 39 are provided in the exhaust heat recovering boiler 37 to perform heat exchange of the mixed gas 5 supplied to the fuel reforming apparatus R1 and the exhaust gas 36 exhausted from the gas turbine 34, the heat in the exhaust gas 36 can be effectively recovered. Therefore, the thermal efficiency of the electric power generating system can be improved.

Furthermore, according to this embodiment, since the fuel reforming apparatus R1 employs the air supply apparatus 45 for supplying air 7 to the fuel reforming apparatus R1, the air supplied to the burner 32 and the fuel reforming apparatus R1 is supplied from separate air supply apparatuses. Thereby, air flow rates to these apparatuses can be separately controlled, and consequently each of the air flow rates can be changed in a wide range. Therefore, the controllability of the electric power generating system can be improved.

Further, according to this embodiment, since a large amount of steam is supplied to the fuel reforming apparatus R1 by supplying the mixed gas 5 containing the steam 11 to the raw fuel 44 and further by mixing the gas to be reformed with the steam 11 supplied to the cooling jacket 10, the fuel gas 46 supplied to the burner 32 from the fuel reforming apparatus R1 contains steam. By doing so, the combustion temperature in the burner 32 is suppressed by the steam contained in the fuel gas 46, and consequently the yield amount of $NO_x$ can be decreased, that is, the amount of $NO_x$ can be lowered. Therefore, the reliability of the electric power generating system can be improved. By lowering the $NO_x$ yield, an apparatus such as a $NO_x$ removal system is not required, and the running cost required for $NO_x$ removal, such as the cost for aqueous ammonia, is decreased, and so the construction of the electric power generating system can be simplified. Therefore, the cost of the electric power generating system can be decreased.

Further, according to this embodiment, since the fuel reforming apparatus R1 reforms the raw fuel to produce the gas to be burned, containing hydrogen, the burning capability (combustion speed, combustion range) in the burner 32 supplied with the fuel gas 46 is improved. Thereby, since it is possible to add further steam to the burner 32, the output power or the efficiency of the electric power generating system can be improved and the heat-electricity ratio (ratio of thermal power output to electric power output) of the electric power generating system can be widely changed. Therefore, the operability of the electric power generating system can be improved.

Figure 7:
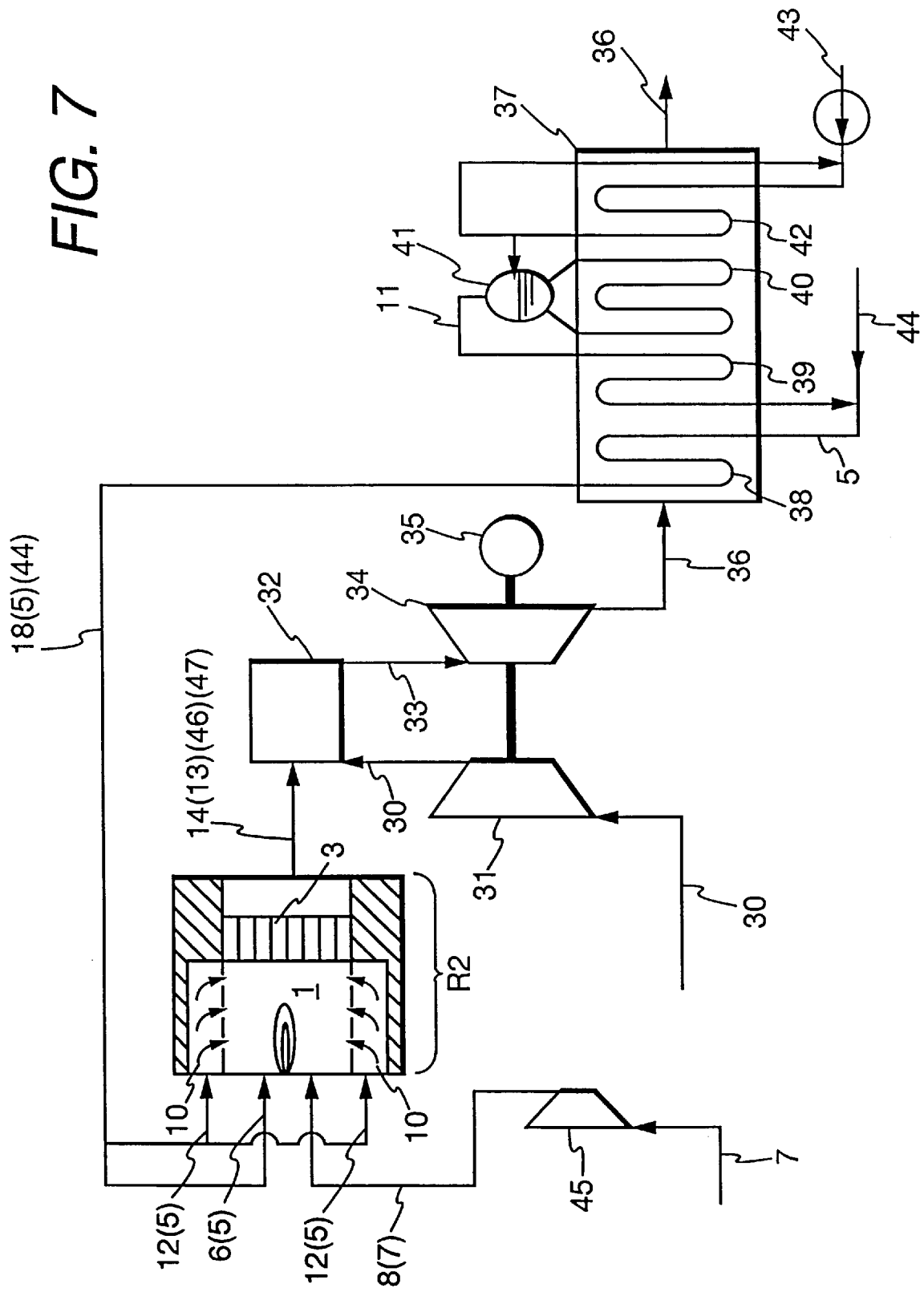
FIG. 7 is a system diagram showing an electric power generating plant having the fuel reforming apparatus of FIG. 2 in accordance with the present invention.

FIG. 7 is a system diagram showing an electric power generating plant having the fuel reforming apparatus of FIG. 2 in accordance with the present invention. Only the different points with respect to the arrangement of FIG. 6 will be described below.

In this embodiment, the mixed gas 5 is also supplied to the cooling jacket 10 of the fuel reforming apparatus R2. Therefore, the cooling medium supplying pipe 12 for supplying the cooling medium to the cooling jacket 10 and the fuel supply pipe 6 for supplying fuel to the flow passage 1 are connected to one end of the common main fuel pipe 18, and the other end of the common main fuel pipe 18 is connected to the mixed gas heater 38.

With the construction as described above, at the start of operation, raw fuel 44 is supplied to the fuel flow passage 1 of the fuel reforming apparatus R2 through the main fuel pipe 18 and the fuel supply pipe 6, and air 7 is supplied to the fuel flow passage 1 of the fuel reforming apparatus R2 through the air supply pipe 8. Then, the supplied raw fuel 44 and the supplied air 7 are burned. An unburned gas 47 obtained by partial combustion having a temperature around several hundreds degrees is supplied to the burner 32 after heating the reforming catalyst bed 3 inside the fuel flow passage 1.

The unburned gas 47 supplied to the burner 32 is mixed with the combustion air 30 supplied from the air compressor 31 and burned. Similar to the aforementioned embodiment, the burned gas 33 obtained by the combustion drives the gas turbine 34 and then is supplied to the exhaust heat recovering boiler 37 as an exhaust gas 36 to exchange heat with the feed water 43. The feed water 43 is changed to steam 11 in the evaporator 40 (drum 41), and then mixed with the raw fuel 44 after being heated by the steam heater 39.

The mixed gas 5 obtained by mixing the steam 11 and the raw fuel 44 is heated by the mixed gas heater 38, is supplied to the fuel flow passage 1 through the main fuel pipe 18 and the fuel supply pipe 6, and also is supplied to the cooling jacket 10 through the main fuel pipe 18 and the cooling medium supply pipe 12.

The mixed gas 5 supplied to the fuel flow passage 1 is diffuse-burned (partially oxidized) with the air 7 supplied to the fuel flow passage through the air supply pipe 8. The high temperature gas obtained by diffuse combustion is mixed with the steam 11 having been supplied into the cooling jacket 10 and having cooled the fuel flow passage 1, is adjusted to a temperature suitable for entering the reforming catalyst bed 3, that is, a temperature suitable for the reforming, and then is allowed to flow into the reforming catalyst bed 3. The gas is reformed by the reforming catalyst bed 3 so as to be changed to the hydrogen enriched gas 13. The hydrogen enriched gas 13 obtained in such a manner is supplied to the burner 32 through the fuel outlet pipe 14. After this time, the hydrogen enriched gas 13 is supplied to the burner 32 as a fuel gas.

According to the arrangement, since the mixed gas 5 supplied to the fuel flow passage 1 by branching from the main fuel pipe 18 is supplied to the cooling jacket 10 of the fuel reforming apparatus R2 through the cooling medium supply pipe 12, the fuel flow passage 1 of the fuel reforming apparatus R2 exposed to the high temperature gas is cooled by the mixed gas 5 from the outside. Thereby, the fuel reforming apparatus R2 can be protected from high temperature heat even if the heat load is changed by the load fluctuation of the gas turbine 34. Therefore, the reliability of the electric power generating system can be improved in the same manner as that of FIG. 6.

According of the system of FIG. 7, the fuel supply pipe 6 and the air supply pipe 8 are connected to one side of the common main fuel pipe 18 and the other end side of the common main fuel pipe 18 is connected to the mixed gas heater 38, while the mixed gas 5 is supplied to the fuel flow passage 1 and the cooling jacket 10. Thereby, a supply pipe for supplying steam from the exhaust heat recovering boiler 37 to the cooling jacket 10 is not required and the construction of the electric power generating system can be simplified. Therefore, the cost of the electric power generating system can be decreased. This construction of an electric power generating system is effective for use in a co-generation system built in a narrow installing area, such as in a factory. This construction of an electric power generating system may be also applied to a combined plant.

Further, according to the system of FIG. 7, since the amount of the steam 11 mixed with the raw fuel 44 is equal to the sum of the amount of the steam mixed with the raw fuel 44 and the amount of the steam mixed with the gas to be reformed as supplied to the cooling jacket 10 in the system of FIG. 6, the amount of the steam supplied to the burner 32 is the same. Therefore, a lowering of the $NO_x$ level can be attained in the same manner as the system of FIG. 6.

Figure 8:
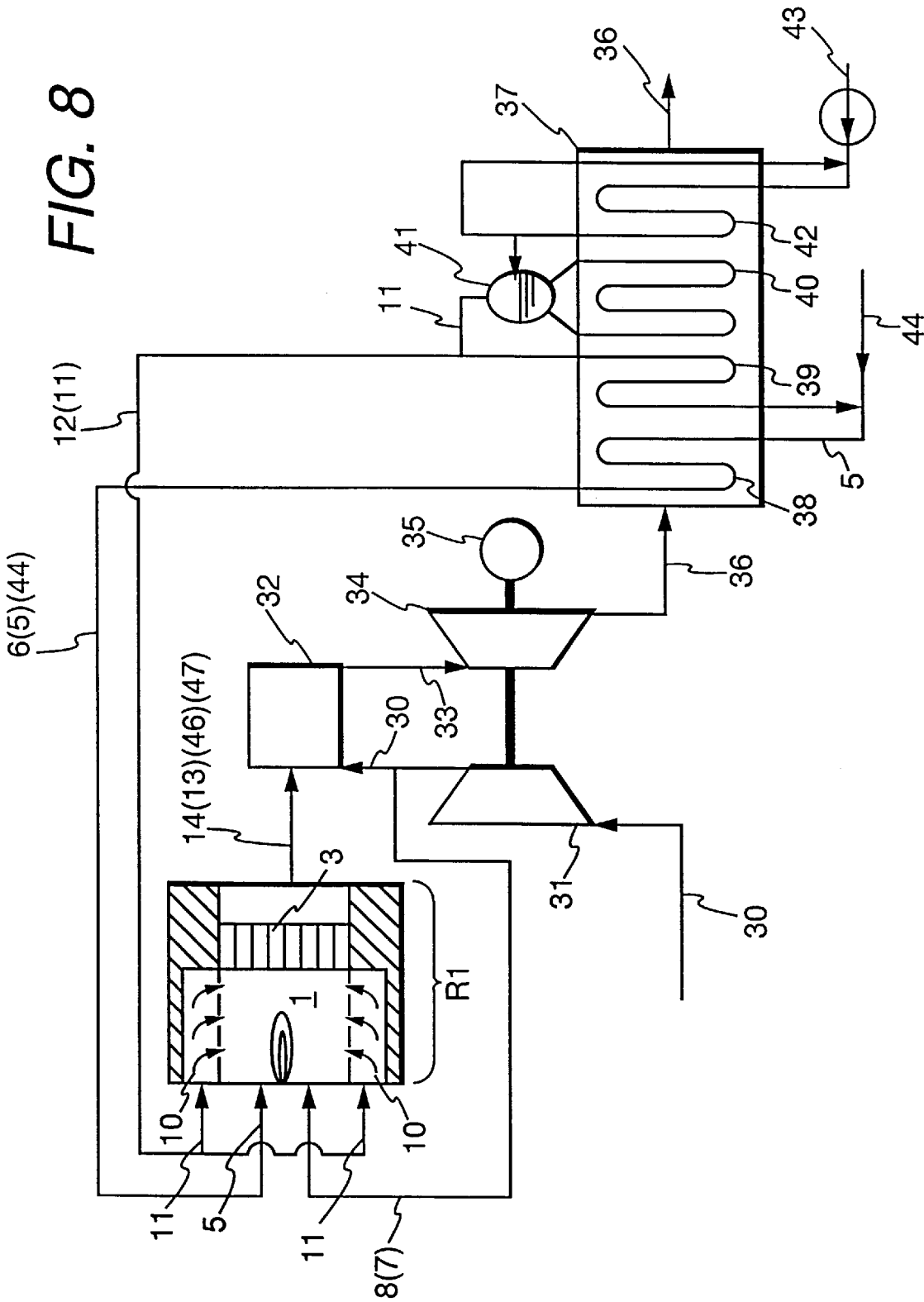
FIG. 8 is a system diagram showing a further embodiment of an electric power generating plant having the fuel reforming apparatus of FIG. 1 in accordance with the present invention.

FIG. 8 is a system diagram showing an electric power generating plant having the fuel reforming apparatus of FIG. 1 in accordance with the present invention. Only the different points with respect to FIG. 6 will be described below.

In this system, the supply source for supplying air to the fuel reforming apparatus R1 is an air compressor 31 for supplying the combustion air 30 to the burner 32. Accordingly, one side of the air supply pipe 18 is connected to the pipe for supplying the combustion air 30 compressed by the air compressor 31. In this case, the flow resistance is determined so that the pressure loss of the combustion air 30 flowing from the air compressor 31 to the burner 32 becomes equal to the total pressure loss of the air 7 extracted from the air supply pipe 18 and supplied to the burner 32 through the fuel reforming apparatus R1.

With the construction as described above, at the start of operation, a raw fuel 44 is supplied to the fuel flow passage 1 of the fuel reforming apparats R1 through the fuel supply pipe 6 and the air 7 branched from the combustion air 30 compressed by the air compressor 31 is supplied to the fuel flow passage 1 of the fuel reforming apparatus R1 through the air supply pipe 8. Since the operation after this is the same as that of FIG. 6, as described above, a description thereof will be omitted.

According to FIG. 8, since one end of the air supply pipe 18 is connected to the pipe for supplying the combustion air 30 compressed by the air compressor 31, a part of the combustion air 30 compressed by the air compressor 31 is extracted and supplied into the fuel flow passage 1 of the fuel reforming apparatus R1 through the air supply pipe 18. Thereby, an air supply apparatus separately provided is not required and the construction of the electric power generating system can be simplified. Therefore, the cost of the electric power generating system can be decreased. This construction of the electric power generating system is effective for use in a co-generation system built in a narrow installing area, such as in a factory. This construction of the electric power generating system may be also applied to a combined plant.

Further, the following modification can be made for the system of FIG. 8.

That is, as shown in FIG. 7, the mixed gas 5 is supplied to the jacket 10 of the fuel reforming apparatus R2, and the cooling medium supply pipe 12 for supplying the cooling medium to the cooling jacket 10 and fuel supply pipe 6 for supplying the fuel to the fuel flow passage 1 are connected to one end of the common main fuel pipe 18 upstream of the main fuel pipe 18, and the other end of the main fuel pipe 18 is connected to the mixed gas heater 38.

By constructing the system as described above, at the start of operation, the raw fuel 44 is supplied into the fuel flow passage 1 through the main fuel pipe 18 and the fuel supply pipe 6. When steam is generated, the mixed gas 5 is supplied into the fuel flow passage 1 through the main fuel pipe 18 and the fuel supply pipe 6, and the mixed gas 5 is also supplied into the cooling jacket 10 through the main fuel pipe 18 and the cooling medium supply pipe 12.

According to this arrangement, since the fuel supply pipe 6 and the air supply pipe 8 are connected to one end of the common main fuel pipe 18 upstream of the main fuel pipe 18 and the other end side of the main fuel pipe 18 is connected to the mixed gas heater 38, the mixed gas is supplied to both the fuel flow passage 1 and the cooling jacket 10. Thereby, there is no need to provide a supply pipe for supplying steam from the exhaust heat recovering boiler 37 to the cooling jacket 10, and the construction of the electric power generating system can be simplified. Therefore, the cost of the electric power generating system can be decreased.

Further, according to this arrangement, since the yield amount of $NO_x$ can be decreased as in the aforementioned system, the reliability of the electric power generating system can be improved.

Figure 9:
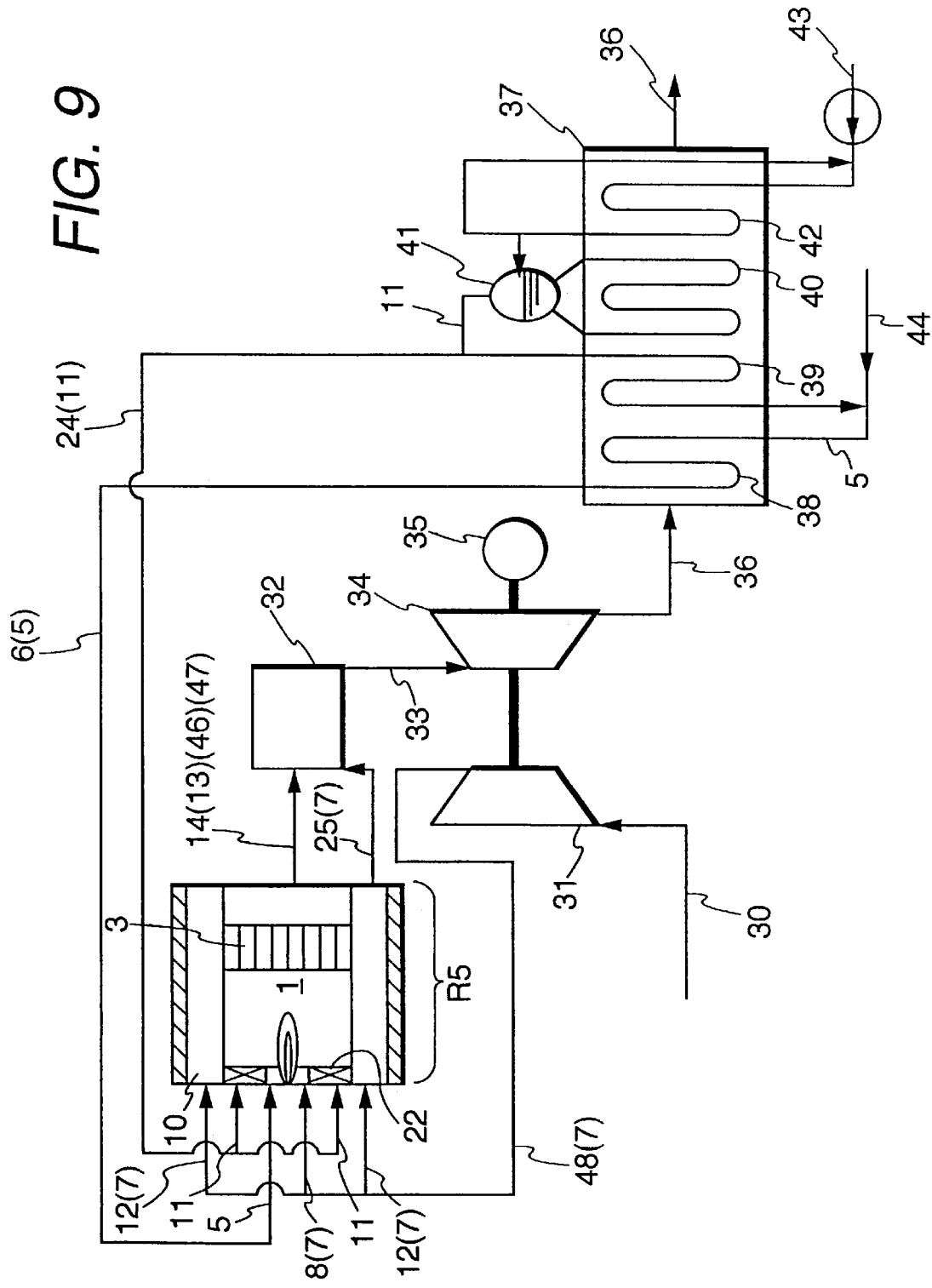
FIG. 9 is a system diagram showing an electric power generating plant having the fuel reforming apparatus of FIG. 5 in accordance with the present invention.

FIG. 9 is a system diagram showing an electric power generating plant having the fuel reforming apparatus of FIG. 5 in accordance with the present invention. This electric power generating system can be roughly classified into a gas turbine system, an exhaust heat recovering system and a fuel reforming system.

The gas turbine system comprises a burner 32 for obtaining high temperature combustion gas 33 by burning combustion air 30 compressed by an air compressor 31 supplied through a fuel reforming system, to be described later, and fuel, and a gas turbine 34 driven by the high temperature combustion gas 33 obtained in the burner 32 for driving an electric power generator 35 directly coupled to the gas turbine 34.

The exhaust heat recovering boiler system comprises an exhaust heat recovering boiler 37 for obtaining steam by exchanging heat between the exhaust gas 36 exhausted from the gas turbine 34 and feed water. In the exhaust heat recovering boiler 37, a mixed gas heater 38, a steam heater 39, an evaporator 40 (drum 41), and an economizer 42 are arranged from the high pressure side of the exhaust gas 36 in this order.

The fuel reforming system comprises a fuel reforming apparatus R5 for obtaining a gas to be reformed by burning a mixed gas 5 supplied through a fuel supply pipe 6 and air 7 supplied from an air compressor 31 through an air supply pipe 8 and for obtaining a fuel gas 46 by reforming the gas using the reforming catalyst bed 3. The reference character 12 denotes a cooling medium supply pipe for supplying air 7 to the cooling jacket 10, one end of the cooling medium supply pipe 12 being connected to the cooling jacket 10, the reference character 24 denotes a steam supply pipe for supplying steam 11 into the fuel flow passage 1, the reference character 14 denotes a fuel outlet pipe for supplying the fuel gas 46 obtained by the fuel reforming apparatus R1 to the burner 32, and the reference character 25 denotes a cooling medium outlet pipe for supplying air 7 supplied in the cooling jacket 10 to the burner 32.

The electric power generating system according to the present invention is constructed as described above, and operates as follows.

At the start of operation, a raw fuel 44 is supplied to the fuel flow passage 1 of the fuel reforming apparatus R5 through the fuel supply pipe 6. At the same time, the air 7 compressed by the air compressor 31 is supplied to the fuel flow passage 1 through a main air pipe 48 and the air supply pipe 8, and air 7 is supplied to the cooling jacket 10 through the main air pipe 48 and the cooling medium supply pipe 12. The supplied raw fuel 44 and the supplied air 7 supplied into the fuel flow passage 1 are ignited by a spark plug (not shown) and burned so as to be changed to an unburned gas 47 having a temperature around several hundred degrees. The unburned gas 47 obtained in such a manner flows inside the fuel flow passage toward the downstream end, and is supplied to the burner 32 through the fuel outlet pipe 14. At this time, the unburned gas 47 heats the reforming catalyst bed 3 installed inside the fuel flow passage 1. The air 7 supplied into the cooling jacket 10 cools the fuel flow passage 1 from the outside and is supplied to the burner 32 through the cooling medium outlet pipe 25.

The unburned gas 47 and the air 7 supplied to the burner 32 are mixed and burned. The combustion produces a high temperature burned gas 33, which drives the gas turbine 34 and is exhausted from the gas turbine 34 as an exhaust gas. The electric power generator 35 directly coupled to the gas turbine 34 is driven by the gas turbine 34.

The exhaust gas 36 exhausted from the gas turbine 34 is supplied to the exhaust heat recovering boiler 37 to exchange heat with the feed water 43. The feed water 43 is supplied to the economizer 42 by a pump so as to be preheated by the low pressure exhaust gas 36. The preheated feed water is supplied to the evaporator 40 (drum 41) and changed to steam 11 by being heated by the high pressure exhaust gas 36. The steam 11 is supplied to the fuel flow passage 1 through the steam supply pipe 24 and the swirl device 22.

The steam 11 is also branched from the cooling medium supply pipe 12 and is supplied to a steam heater 39 so as to be heated by the higher pressure exhaust gas 36. The heated steam 11 is mixed with the raw fuel 44 (methane is employed in this embodiment) and is supplied to a mixed gas heater 38 so as to be heated by the highest pressure exhaust gas 36. The mixed gas 5 obtained in such a manner is supplied to the fuel flow passage 1 of the fuel reforming apparatus R5 through the fuel supply pipe 6.

The mixed gas 5 supplied to the fuel flow passage 1 is diffuse-burned (partially oxidized) with the air 7 supplied to the fuel flow passage through the air supply pipe 8. The high temperature gas obtained by the diffuse combustion is mixed with the steam 11 supplied to the fuel flow passage through the swirl device 22 and is adjusted to a temperature suitable for entering the reforming catalyst bed 3, that is, a temperature suitable for reforming, and then it is allowed to flow into the reforming catalyst bed 3. The gas is reformed by the reforming catalyst bed 3 so as to be changed to the hydrogen enriched gas 13. The hydrogen enriched gas 13 obtained in such a manner is supplied to the burner 32 through the fuel outlet pipe 14. After this, the hydrogen enriched gas 13 is supplied to the burner 32 as a fuel gas.

According to the system of FIG. 9, since the air 7 compressed by the air compressor 31 is supplied to the cooling jacket 10 of the fuel reforming apparatus R5 through the main air pipe 48 and the cooling medium supply pipe 12, the fuel flow passage 1 of the fuel reforming apparatus R5 exposed to the high temperature gas is cooled by the steam 11 from the outside. Further, since the steam 11 obtained by the exhaust heat recovering boiler 37 is supplied to the fuel flow passage 1 through the steam supply pipe 24 and the swirl device 22, the fuel flow passage 1 exposed to the high temperature gas is cooled from the inside. Thereby, the fuel reforming apparatus R5 can be protected from high temperature heat even if the heat load is changed by the load fluctuation of the gas turbine 34. Therefore, the reliability of the electric power generating system can be improved.

Further, according to this arrangement in which the air supplied from the air compressor 31 to the burner 32 is supplied through the cooling jacket 10 of the fuel reforming apparatus R6, the air is supplied after cooling the fuel reforming apparatus R5. Thereby, the fuel reforming apparatus R5 is cooled even when the system is starting up. Therefore, the reliability of the electric power generating system can be improved.

Further, according to the invention, since the mixed gas heater 38 and the steam heater 39 are provided in the exhaust heat recovering boiler 37 to perform heat exchange of the mixed gas 5 supplied to the fuel reforming apparatus R1 and the exhaust gas 36 exhausted from the gas turbine 34, the heat in the exhaust gas 36 can be effectively recovered. Therefore, the thermal efficiency of the electric power generating system can be improved.

Furthermore, according to the invention, since the main air pipe 48 for supplying the air 7 compressed by the air compressor 31 to the reforming system and the air supply pipe 8 and the cooling medium supply pipe 12 are connected to the main air pipe 48, the air 7 compressed by the air compressor 31 is supplied to the fuel flow passage 1 through the main air pipe 48 and the air supply pipe 8 and supplied into the cooling jacket 10 through the main air pipe 48 and the cooling medium supply pipe 12. Further, since the cooling medium outlet pipe 25 is connected to the burner 32, the air 7 is supplied into the cooling jacket 10 is supplied to the burner 32 through the cooling medium outlet pipe 25. Thereby a separate air supply apparatus for supplying air to the fuel reforming apparatus R5 is not required. Furthermore, since the fuel reforming apparatus R5 and the burner 32 are connected in series, it is possible to construct the fuel reforming apparatus R5 and the burner 32 as a unit, whereby the electric power generating system can be made simple. Therefore, the cost of the electric power generating system can be decreased. This construction of electric power generating system is effective for use in a co-generation system built in a narrow installing area, such as in a factory. This construction of an electric power generating system may be also applied to a combined plant.

Further, according to the invention, since a large amount of steam is supplied to the fuel reforming apparatus R5 by supplying the mixed gas containing the steam 11 to the raw fuel 44, and further by supplying the steam 11 into the fuel flow passage 1 to mix with the gas to be reformed, the fuel gas 46 supplied to the burner 32 from the fuel reforming apparatus R5 will contain steam. Thus, the combustion temperature in the burner 32 is suppressed by the steam contained in the fuel gas 46, and consequently the yield amount of $NO_x$ can be decreased, that is, the amount of $NO_x$ can be lowered. Therefore, the reliability of the electric power generating system can be improved.

By lowering the $NO_x$ yield, an apparatus, such as a $NO_x$ removal system, is not required, and the running cost required for $NO_x$ removal, such as the cost for aqueous ammonia, is decreased, and the construction of the electric power generating system can be simplified. Therefore, the cost of the electric power generating system can be decreased.

Further, according to the invention, since the fuel reforming apparatus R5 reforms the raw fuel to produce a fuel gas 46 containing hydrogen, the burning capability (combustion speed, combustion range) in the burner 32 supplied with the fuel gas 46 is improved. Thereby, since it is possible to add further steam to the burner 32, the output power or the efficiency of the electric power generating system can be improved and the heat-electricity ratio (ratio of thermal power output to the electric power output) of the electric power generating system can be widely changed. Therefore, the operability of the electric power generating system can be improved.

According to the present invention, since the cooling jacket is arranged adjacent to the fuel flow passage and a cooling medium for cooling the fuel flow passage is introduced into the cooling jacket, the fuel flow passage can be protected from high temperature even if the heat load changes due to the load fluctuation of the gas turbine.

Therefore, it is possible to provide a fuel reforming apparatus having a high reliability which can be applied to a gas turbine electric power generating system. Further, it is possible to provide a electric power generating system having a high reliability with the fuel reforming apparatus of the present invention.

We claim:

1. A burning apparatus comprising a fuel reforming apparatus and a burner for receiving reformed fuel from said fuel reforming apparatus and an oxidizing agent and burning the reformed fuel, wherein said fuel reforming apparatus comprises a fuel flow passage for obtaining a reformed gas in which a mixture gas with fuel flows from an upstream side to a downstream side, said fuel flow passage having an inlet for the mixture gas and air at the upstream side and an outlet for the reformed gas at the downstream side, and a cooling jacket surrounding said fuel flow passage for introducing a cooling medium into said flow passage through a plurality of positions.

2. A burning apparatus according to claim 1, wherein said cooling jacket has an inlet for the cooling medium, said cooling medium being a mixture of fuel and steam.

3. A burning apparatus according to claim 1, wherein a pipe is provided for a mixture of fuel and steam, said pipe communicating with said inlet of said fuel flow passage and said inlet of said cooling jacket.

4. A burning apparatus according to claim 1, wherein a flow straightener is provided around a downstream end of said cooling jacket.

5. A burning apparatus according to claim 1, wherein said fuel flow passage is composed of a plurality of passages having different diameters.

* * * * *